United States Patent
Yuasa

(10) Patent No.: US 9,725,101 B2
(45) Date of Patent: Aug. 8, 2017

(54) VEHICLE AIR-CONDITIONING SYSTEM

(75) Inventor: Hiroyuki Yuasa, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 1144 days.

(21) Appl. No.: 12/990,509

(22) PCT Filed: May 30, 2008

(86) PCT No.: PCT/JP2008/059968
§ 371 (c)(1),
(2), (4) Date: Nov. 1, 2010

(87) PCT Pub. No.: WO2009/144808
PCT Pub. Date: Dec. 3, 2009

(65) Prior Publication Data
US 2011/0053484 A1 Mar. 3, 2011

(51) Int. Cl.
*B60H 1/24* (2006.01)
*B61D 27/00* (2006.01)
*B60H 1/00* (2006.01)

(52) U.S. Cl.
CPC ......... *B61D 27/00* (2013.01); *B60H 1/00371* (2013.01); *B60H 1/00807* (2013.01);
(Continued)

(58) Field of Classification Search
CPC .................................................... B60H 1/24
(Continued)

(56) References Cited

U.S. PATENT DOCUMENTS 4,870,895 A * 10/1989 Mayer ........................... 454/120
5,253,484 A * 10/1993 Corman et al. ................. 62/239
(Continued)

FOREIGN PATENT DOCUMENTS

CN  1252364 A  5/2000
CN  1278492 A  1/2001
(Continued)

OTHER PUBLICATIONS

International Search Report (PCT/ISA/210) for PCT/JP2008/059968 dated Jun. 24, 2008.
(Continued)

*Primary Examiner* — Steven B McAllister
*Assistant Examiner* — Samantha Miller
(74) *Attorney, Agent, or Firm* — Buchanan Ingersoll & Rooney PC

(57) ABSTRACT

A passenger compartment duct is provided with a passenger compartment air blow opening through which air is supplied into a passenger compartment and a cab-air-supply-duct communicating opening communicating with a cab air supply duct. The cab air supply duct is provided with a cab air blow opening through which air is supplied into a cab and a passenger-compartment-duct communicating opening communicating with the passenger compartment air supply duct. There are provided a damper turning communication from the passenger compartment air supply duct to the cab air supply duct ON or OFF, a cab air outlet through which air in the cab is discharged to the outside of the cab, and a damper opening or closing the cab air outlet. The cab air outlet includes a first outlet opened so as to communicate with an air intake side of cab air-conditioning units and a second outlet opened so as to communicate with the passenger compartment. The damper selectively discharges air (Continued)

in the cab to either the outside air intake side of the cab air-conditioning units or the passenger compartment.

11 Claims, 2 Drawing Sheets

(52) U.S. Cl.
CPC ..... *B60H 1/00835* (2013.01); *B60H 1/00821* (2013.01); *B60H 2001/00942* (2013.01)

(58) Field of Classification Search
USPC .................................................. 454/141, 145
IPC ............................................. B60H 1/24,1/141
See application file for complete search history.

(56) References Cited

U.S. PATENT DOCUMENTS

| | | | | |
|---|---|---|---|---|
| 5,389,035 | A | * | 2/1995 | Ishida et al. ..................... 454/99 |
| 5,937,664 | A | * | 8/1999 | Matsuno et al. ............. 62/259.2 |
| 6,059,016 | A | * | 5/2000 | Rafalovich et al. ............ 165/41 |
| 6,332,497 | B1 | | 12/2001 | Niwa et al. |
| 6,808,450 | B2 | * | 10/2004 | Snow ............................ 454/137 |
| 2002/0072322 | A1 | * | 6/2002 | Sharp .................. F24F 11/0001 454/229 |
| 2007/0213000 | A1 | * | 9/2007 | Day ................... H05K 7/20745 454/184 |

FOREIGN PATENT DOCUMENTS

| | | |
|---|---|---|
| JP | 56-039357 U | 4/1981 |
| JP | 57-153011 U | 9/1982 |
| JP | 62-145716 U | 9/1987 |
| JP | 05-000622 A | 1/1993 |
| JP | 05-016542 U | 3/1993 |
| JP | 05-069824 A | 3/1993 |
| JP | 05-040079 U | 5/1993 |
| JP | 08-080726 A | 3/1996 |
| JP | 2007-223543 A | 9/2007 |

OTHER PUBLICATIONS

Office Action (Notification of Reasons for Refusal) dated Jun. 26, 2012, issued in corresponding Japanese Patent Application No. 2010-514302, and an English Translation thereof. (4 pages).

Office Action dated Jun. 27, 2012, issued in corresponding Chinese Patent Application No. 200880129575.6, and an English Translation thereof. (7 pages).

Office Action (Examination Report) dated Dec. 13, 2011, issued in the corresponding United Kingdom Patent Application No. GB1018175.8. (2 pages).

* cited by examiner

VEHICLE AIR-CONDITIONING SYSTEM

TECHNICAL FIELD

The present invention relates to vehicle air-conditioning, and in particular, to air-conditioning for a cab of a vehicle.

BACKGROUND ART

In a related-art air-conditioning for railway vehicle, a system for air-conditioning a cab using an air-conditioning apparatus dedicated to the cab has been known (for example, Patent Document 1).

There is another system for air-conditioning a cab and a passenger compartment using different air-conditioning apparatuses. In such an air-conditioning system, the air in the passenger compartment is mixed with fresh outside air to be conditioned in the passenger compartment air-conditioning apparatus and, after that, the resultant air is supplied to the passenger compartment through a passenger compartment air supply duct. Similarly, the air in the cab is mixed with fresh outside air to be conditioned in the cab air-conditioning apparatus and, after that, the resultant air is supplied to the cab through a cab air supply duct. In the above-described related-art railway vehicle air-conditioning systems, air-conditioning for a passenger compartment is completely separated from that for a cab to form individual closed paths. Accordingly, there is no coming and going of the air between the passenger compartment and the cab.

Patent Document 1

Japanese Unexamined Utility Model Registration Application Publication No. 5-40079

DISCLOSURE OF INVENTION

Problems to be Solved by the Invention

A typical cab air-conditioning apparatus includes a minimum number of units because its air-conditioning capacity may be small. Most of the units are not made redundant. Accordingly, the apparatus has poor redundancy. A failure of a component unit directly leads to the loss of an air-conditioning function. The loss of the air-conditioning function in the cab air-conditioning apparatus may affect the rate of operation of a vehicle and the reliability thereof.

This invention has been made to solve the above-described problems. It is an object to propose a highly reliable vehicle air-conditioning system capable of increasing the rate of operation of a vehicle in an inexpensive and easy way.

Means for Solving the Problems

According to this invention, there is provided a vehicle air-conditioning system including a passenger compartment air-conditioning apparatus that air-conditions a passenger compartment, a cab air-conditioning apparatus that air-conditions a cab, a passenger compartment duct through which the air conditioned by the passenger compartment air-conditioning apparatus is allowed to flow into the passenger compartment, and a cab duct through which the air conditioned by the cab air-conditioning apparatus is allowed to flow into the cab, the passenger compartment duct being provided with a passenger compartment air blow opening through which the air is supplied into the passenger compartment and a cab-duct communicating opening which communicates with the cab duct, the cab duct being provided with a cab air blow opening through which the air is supplied into the cab and a passenger-compartment-duct communicating opening which communicates with the passenger compartment, the system including a duct opening and closing device that turns communication from the passenger compartment duct to the cab duct ON or OFT, a cab air outlet through which the air in the cab is discharged to the outside of the cab, and an outlet opening and closing device that opens or closes the cab air outlet.

The cab air outlet may include a first outlet opened so as to communicate with an air intake side of the cab air-conditioning apparatus and a second outlet opened so as to communicate with the passenger compartment. The outlet opening and closing device may selectively discharge the air in the cab to either the outside air intake side of the cab air-conditioning apparatus or the passenger compartment.

The cab air outlet may include a first outlet opened so as to communicate with an air intake side of the cab air-conditioning apparatus and a third outlet opened so as to communicate with the outside air side. The outlet opening and closing device may open or close the third outlet.

Advantages

According to the vehicle air-conditioning system of this invention, in normal mode, the passenger compartment is air-conditioned using the passenger compartment air-conditioning apparatus and the passenger compartment duct and the cab can be air-conditioned using the cab air-conditioning apparatus and the cab duct.

Whereas, in case of failure of the cab air-conditioning apparatus, the duct opening and closing device turns the communication from the passenger compartment duct to the cab duct ON and the outlet opening and closing device opens the cab air outlet that communicates with the passenger compartment. Consequently, part of air conditioned by the passenger compartment air-conditioning apparatus is supplied to the cab, thus air-conditioning the cab.

Figure 1:
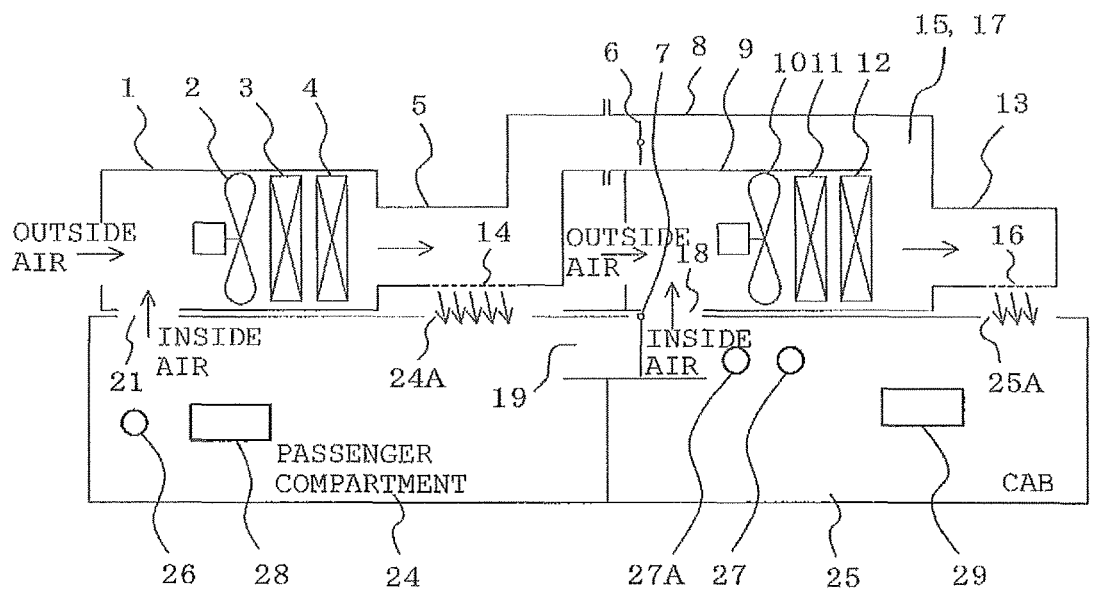
FIG. 1 is a diagram of the structure of a vehicle air-conditioning system illustrating Embodiment 1 of the invention (in normal mode).

REFERENCE NUMERALS 1 shell of passenger compartment air-conditioning apparatus
2 blower of passenger compartment air-conditioning apparatus
3 indoor heat exchanger of passenger compartment air-conditioning apparatus
4 heater of passenger compartment air-conditioning apparatus
5 passenger compartment air supply duct
6 damper
7 damper 8 bypass duct
9 shell of cab air-conditioning apparatus
10 blower of cab air-conditioning apparatus
11 indoor heat exchanger of cab air-conditioning apparatus
12 heater of cab air-conditioning apparatus
13 cab air supply duct
14 passenger compartment air blow opening
15 cab-duct communicating opening
16 cab air blow opening
17 passenger-compartment-duct communicating opening
18 first outlet (cab air outlet)
19 second outlet (cab air outlet)
20 third outlet (cab air outlet)
21 fourth outlet (cab air outlet)
24 passenger compartment
24A air intake port of passenger compartment
25 cab
25A air intake port of cab
26 passenger compartment temperature sensor
27 cab temperature sensor
27A auxiliary cab temperature sensor
28 passenger compartment air-conditioning controller
29 cab air-conditioning controller

BEST MODES FOR CARRYING OUT THE INVENTION

Embodiment 1

Figure 2:
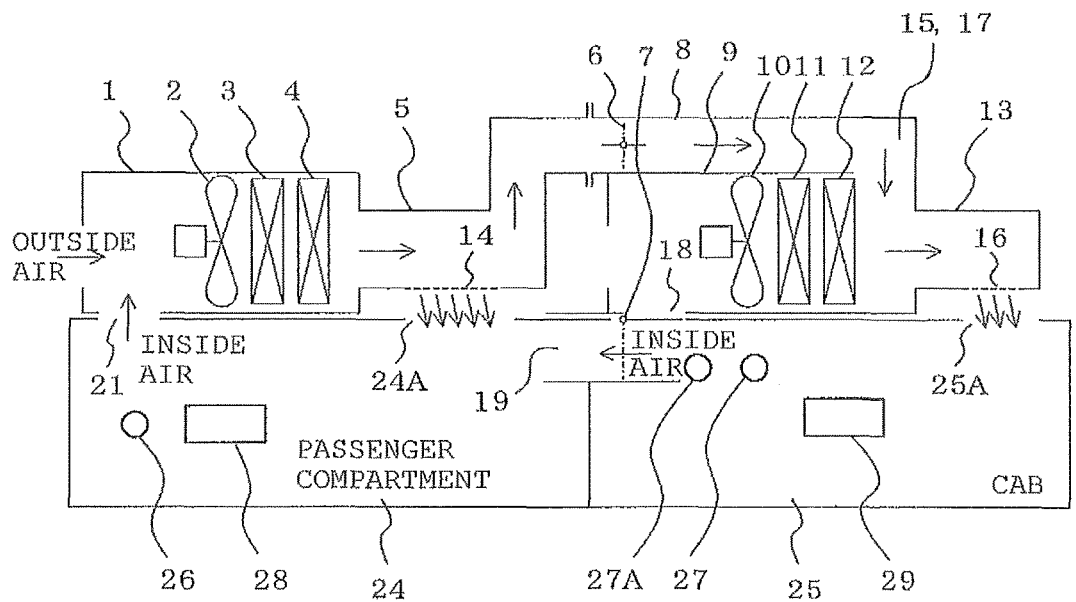
FIG. 2 is a diagram of the structure of the vehicle air-conditioning system illustrating Embodiment 1 of the invention (in case of failure of a cab air-conditioning apparatus).

FIGS. 1 and 2 are diagrams of the structure of a vehicle air-conditioning system illustrating Embodiment 1 of the present invention. FIG. 1 illustrates normal mode. FIG. 2 illustrates mode in case of failure of a cab air-conditioning apparatus.

In this case, to air-condition a passenger compartment 24 using a passenger compartment air-conditioning apparatus including a shell 1 of the passenger compartment air-conditioning apparatus, a blower 2, an indoor heat exchanger 3, and a heater 4, and a passenger compartment air supply duct (or passenger compartment duct) 5, a passenger compartment air blow opening 14 of the passenger compartment air supply duct 5 is placed so as to face an air intake 24A of the passenger compartment 24.

In the normal mode, to air-condition a cab 25 using a cab air-conditioning apparatus including a shell 9 of the cab air-conditioning apparatus, a blower 10, an indoor heat exchanger 11, and a heater 12, and a cab air supply duct (or cab duct) 13, a cab air blow opening 16 of the cab air supply duct 13 is placed so as to face an air intake 25A of the cab 25.

The passenger compartment air supply duct 5 is extended by a bypass duct (extension of the passenger compartment air supply duct) 8 and is connected to the cab air supply duct 13. The bypass duct 8 may be placed in the shell 9 of the cab air-conditioning apparatus. In the following description, the passenger compartment air supply duct 5 and the bypass duct 8 may be together referred to as the passenger compartment air supply duct 5.

The passenger compartment air supply duct 5 is communicatably connected with the cab air supply duct 13 such that a cab-duct communicating opening 15 of the passenger compartment air supply duct 5 is coupled to a passenger-compartment-duct communicating opening 17 of the cab air supply duct 13. The bypass duct 8 is provided with a damper 6 which serves as a duct opening and closing device that turns communication from the passenger compartment air supply duct 5 to the cab air supply duct 13 ON or OFF.

The cab 25 is provided with a cab air outlet through which the air in the cab 25 is discharged to the outside of the cab and an outlet opening and closing device that opens and closes the cab air outlet. That is, the cab air outlet includes a first outlet 18 opened so as to communicate with an air intake side of the cab air-conditioning apparatus and a second outlet 19 opened so as to communicate with the passenger compartment 24. Furthermore, the outlet opening and closing device for selectively opening the first outlet 18 and the second outlet 19 includes a damper 7 provided on a partition wall between the passenger compartment 24 and the cab 25.

On the other hand, the passenger compartment 24 is provided with a fourth outlet 21 opened so as to communicate with an air intake side of the passenger compartment air-conditioning apparatus.

Furthermore, a passenger compartment temperature sensor 26 that detects a temperature of the air in the passenger compartment is provided in the passenger compartment 24. The passenger compartment temperature sensor 26 is communicatably connected with a passenger compartment air-conditioning controller 28 that controls the operation of the passenger compartment air-conditioning apparatus. The passenger compartment air-conditioning controller 28 controls the passenger compartment air-conditioning apparatus on the basis of a value detected by the passenger compartment temperature sensor 26.

Similarly, a cab temperature sensor 27 that detects a temperature of the air in the cab is provided in the cab 25. The cab temperature sensor 27 is communicatably connected with a cab air-conditioning controller 29 that controls the operation of the cab air-conditioning apparatus. The cab air-conditioning controller 29 controls the cab air-conditioning apparatus on the basis of a value detected by the cab temperature sensor 27.

In addition, an auxiliary cab temperature sensor 27A that detects a temperature of the air in the cab is provided in the cab 25. This cab temperature sensor 27A is communicatably connected with the passenger compartment air-conditioning controller 28 and its operation will be described later.

The operation of the vehicle air-conditioning system of Embodiment 1 will now be described. In the normal mode of the vehicle air-conditioning system of Embodiment 1, as shown in FIG. 1, the damper 6 is positioned so as to turn the communication between the passenger compartment air supply duct 5 and the cab air supply duct 13 OFF (interruption state) and the damper 7 is positioned so as to open the first outlet 18 and close the second outlet 19.

In the above-described normal mode, the passenger compartment air-conditioning apparatus including the shell 1 of the passenger compartment air-conditioning apparatus, the blower 2, the indoor heat exchanger 3, and the heater 4 takes in fresh outside air and also takes in inside air in the vehicle through the fourth outlet 21 to mix the airs, controls the temperature and/or the humidity, and supplies the resultant air from the passenger compartment air blow opening 14 of the passenger compartment air supply duct 5 through the air intake 24A to the passenger compartment 24, thus air-conditioning the passenger compartment 24.

Furthermore, the cab air-conditioning apparatus including the shell 9 of the cab air-conditioning apparatus, the blower 10, the indoor heat exchanger 11, and the heater 12 takes in fresh outside air and also takes in the inside air in the vehicle through the first outlet 18 of the cab 25, controls the temperature and/or the humidity, and supplies the resultant air through the cab air blow opening 16 of the cab air supply duct 13 and the air intake 25A to the cab 25, thus air-conditioning the cab 25. In the normal mode, therefore, the passenger compartment air-conditioning apparatus and the cab air-conditioning apparatus are operated independent of each other and there is no coming and going of conditioned air or the inside air in the vehicle between the passenger compartment 24 and the cab 25.

Then, the operation in case of failure of the cab air-conditioning apparatus will be described. In the vehicle air-conditioning system of Embodiment 1, during the failure of the cab air-conditioning apparatus, as shown in FIG. 2, the damper 6 is positioned so as to turn the communication between the passenger compartment air supply duct 5 and the cab air supply duct 130N (communication state) and the damper 7 is positioned so as to close the first outlet 18 and open the second outlet 19. In this case, the passenger compartment air-conditioning apparatus including the shell 1 of the passenger compartment air-conditioning apparatus, the blower 2, the indoor heat exchanger 3, and the heater 4 takes in fresh outside air and also takes in inside air in the passenger compartment 24 and the cab 25 through the fourth outlet 21 to mix the airs, controls the temperature and/or the humidity, and supplies the resultant air from the passenger compartment air blow opening 14 of the passenger compartment air supply duct 5 to the passenger compartment 24, thus air-conditioning the passenger compartment 24. Simultaneously, part of the conditioned air enters the cab air supply duct 13 through the bypass duct 8 and further enters the cab 25 through the cab air blow opening 16, thus air-conditioning the cab 25. After the cab 25 is air-conditioned by the conditioned air supplied to the cab 25, the conditioned air is returned through the second outlet 19 to the passenger compartment 24.

Consequently, even if the cab air-conditioning apparatus is not made dual-redundant, the cab can be air-conditioned in case of failure of the cab air-conditioning apparatus, thus increasing the rate of operation of the vehicle.

Embodiment 2

Figure 3:
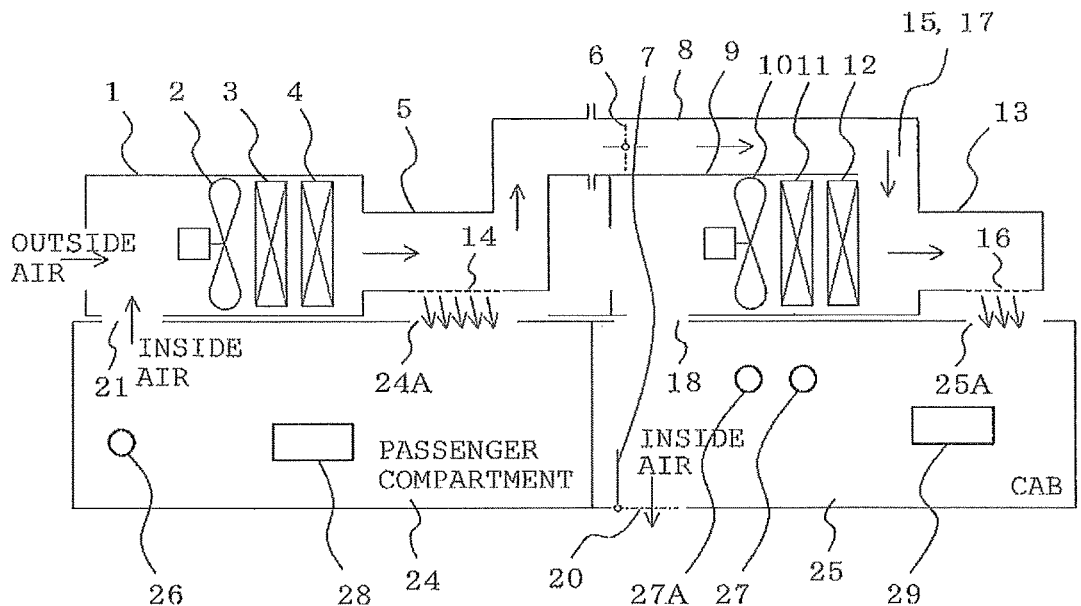
FIG. 3 is a diagram of the structure of a vehicle air-conditioning system illustrating Embodiment 2 of the invention (in case of failure of a cab air-conditioning apparatus).

FIG. 3 is a diagram of the structure of a vehicle air-conditioning system illustrating Embodiment 2 of the present invention and illustrates mode in case of failure of the cab air-conditioning apparatus. Embodiment 2 has the structure in which air in the cab 25 is discharged to the outside through a third outlet 20 provided on one wall of the vehicle body and the damper 7 is placed not in the partition wall between the passenger compartment 24 and the cab 25 but in the third outlet 20 so as to open or close the third outlet 20.

Next, the operation of the vehicle air-conditioning system of Embodiment 2 will now be described. In the vehicle air-conditioning system of Embodiment 2, in normal mode, the damper 6 is positioned so as to turn the communication between the passenger compartment air supply duct 5 and the cab air supply duct 13 OFF (interruption state) and the damper 7 is positioned so as to close the third outlet 20.

In the normal mode, the passenger compartment air-conditioning apparatus including the shell 1 of the passenger compartment air-conditioning apparatus, the blower 2, the indoor heat exchanger 3, and the heater 4 takes in fresh outside air and inside air in the vehicle through the fourth outlet 21 of the passenger compartment 24 to mix them, controls the temperature and/or the humidity, and supplies the resultant air from the passenger compartment air blow opening 14 of the passenger compartment air supply duct 5 through the air intake port 24A to the passenger compartment 24, and thereby air-conditions the passenger compartment 24. In addition, the cab air-conditioning apparatus including the shell 9 of the cab air-conditioning apparatus, the blower 10, the indoor heat exchanger 11, and the heater 12 takes in fresh outside air and the inside air in the vehicle from the first outlet 18 of the cab 25, controls the temperature and/or the humidity, and supplies the resultant air from the cab air blow opening 16 of the cab air supply duct 13 through the air intake port 25A to the cab 25, and thereby air-conditions the cab 25. In the normal mode, therefore, the passenger compartment air-conditioning apparatus and the cab air-conditioning apparatus are operated independent of each other and there is no coming and going of conditioned air or the air in the vehicle between the passenger compartment 24 and the cab 25.

Then, the operation in case of failure of the cab air-conditioning apparatus will be described. In the vehicle air-conditioning system of Embodiment 2, during the failure of the cab air-conditioning apparatus, as shown in FIG. 3, the damper 6 is positioned so as to turn the communication between the passenger compartment air supply duct 5 and the cab air supply duct 13 ON (communication state) and the damper 7 is positioned so as to open the third outlet 20. In this case, the passenger compartment air-conditioning apparatus including the shell 1 of the passenger compartment air-conditioning apparatus, the blower 2, the indoor heat exchanger 3, and the heater 4 takes in fresh outside air and also takes in the air in the vehicle from the passenger compartment 24 and the cab 25 through the fourth outlet 21 to mix the airs, controls the temperature and/or the humidity, and supplies the resultant air from the passenger compartment air blow opening 14 of the passenger compartment air supply duct 5 to the passenger compartment 24, thus air-conditioning the passenger compartment 24. Simultaneously, part of the conditioned air enters the cab air supply duct 13 through the bypass duct 8 and further enters the cab 25 through the cab air blow opening 16, thus air-conditioning the cab 25. After the cab 25 is air-conditioned by the conditioned air supplied to the cab 25, the conditioned air is discharged to the outside of the vehicle through the third outlet 20.

Thus, even if the cab air-conditioning apparatus is not made dual-redundant, the cab can be air-conditioned in case of failure of the cab air-conditioning apparatus, thus increasing the rate of operation of the vehicle.

In a related-art air-conditioning system, in case of failure of a unit, which is included in a cab air-conditioning apparatus and is not made dual-redundant, a function related to the failed unit is lost. For example, if a blower of the cab air-conditioning apparatus is failed, all of functions related to the blower, namely, all of cooling, heating, and ventilating functions are lost. In this case, however, with the above-described structure of Embodiment 1 or 2, the blower of the passenger compartment air-conditioning apparatus supplies mixed air including fresh outside air, furthermore, cooled or heated conditioned air to the cab, thus complementing part of minimum required functions of the air-conditioning apparatus. Consequently, the reliability and the rate of operation of the entire vehicle can be increased.

The above-described Embodiments 1 and 2 have been explained on the assumption of the railway vehicle. The present invention is also applicable to another vehicle having a cab and a passenger compartment.

When a vehicle with the cab 25 has a closable window or opening, the window or opening can be used as the above-described outlet 19 or 20 and the damper 7.

The dampers 6 and 7, each serving as an opening and closing device, may be operated manually. Furthermore, assuming that a vehicle is provided with a monitoring device (including a monitor, a communication unit, and the like) for monitoring inside air in the vehicle, when an abnormal temperature in the cab 25 is detected under control of the monitoring unit, the dampers 6 and 7 may be operated in accordance with the detection.

The opening and closing device is not limited to a damper. The damper may be replaced with another device having the same action.

A method of controlling the air-conditioning system in case of failure of the cab air-conditioning apparatus will now be described. It is assumed that if failure of the cab air-conditioning apparatus cannot be detected, for example, when the power supply is lost or the cab air-conditioning controller 29 is failed, the damper 6 and the damper 7 are automatically opened due to their mechanical properties, for example, springback.

Furthermore, the cab air-conditioning controller 29 opens the damper 6 and the damper 7 when detecting the loss of ventilation and cooling or heating functions.

Some control examples will be described below.

Control Example 1

In case of failure of the cab air-conditioning apparatus, the passenger compartment air-conditioning apparatus is used to complement the ventilating and cooling or heating functions for the cab 25 and can be prevented from being used for positive temperature control in the cab 25.

Control Example 2

In case of failure of the cab air-conditioning apparatus, the passenger compartment air-conditioning controller 28 controls the passenger compartment air-conditioning apparatus on the basis of a value detected by the auxiliary cab temperature sensor 27A so that the temperature of the air in the cab 25 can be controlled to the extent possible.

Control Example 3

It is assumed that the vehicle is provided with a monitoring device (including a monitor, a communication unit, and the like) for monitoring the air in the vehicle. A temperature detected by the cab temperature sensor 27 is transmitted to this monitoring device and the monitoring device transmits the temperature to the passenger compartment air-conditioning controller 28. The passenger compartment air-conditioning controller 28, which has received, temperature information related to the cab 25, controls the passenger compartment air-conditioning apparatus on the basis of the temperature information and controls the temperature in the cab 25 to the extent possible.

In the above-described Control Examples 2 and 3, the best control is to minimize the difference between the temperature in the passenger compartment and a target temperature and that between the temperature in the cab and a target temperature. Any one of the temperatures may be preferentially controlled.

Figure 4:
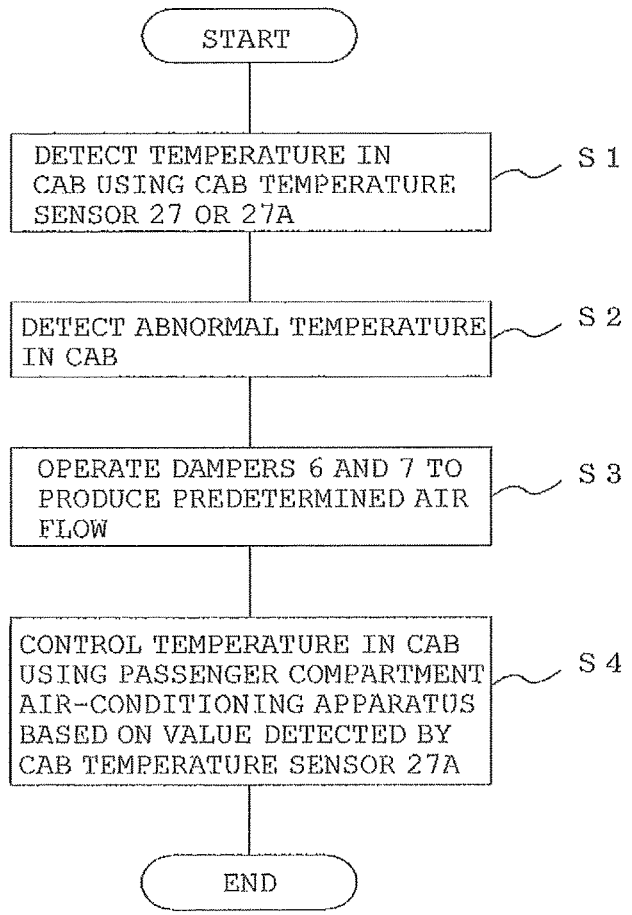
FIG. 4 is a flowchart illustrating an exemplary operation of the vehicle air-conditioning system of Embodiment 1.

An example of the operation of the vehicle air-conditioning system of Embodiment 1 in case of failure of the cab air-conditioning apparatus will finally be described with reference to a flowchart of FIG. 4. It is assumed that the control of the entire vehicle air-conditioning system is performed by the monitoring device described in the above-described Control Example 3 and the component units constituting the vehicle air-conditioning system operate under the control of the monitoring device.

When the operation of the vehicle air-conditioning system starts, the temperature in the cab 25 is detected using the cab temperature sensor 27 or 27A (S1).

When an abnormal temperature in the cab 25 is detected (S2), the cab air-conditioning controller 29 or springback allows the dampers 6 and 7 to operate, thus producing a predetermined air flow (S), as shown in FIG. 2.

After that, the passenger compartment air-conditioning controller 28 controls the passenger compartment air-conditioning apparatus on the basis of values detected by the passenger compartment temperature sensor 26 and the cab temperature sensor (in this case, the auxiliary cab temperature sensor 27A) so that the difference between the temperature in the passenger compartment 24 and a target temperature and that between the temperature in the cab 25 and a target temperature are minimized (S4). This control may be performed in a manner similar to the above-described Control Example 1.

The invention claimed is:

1. A vehicle air-conditioning system comprising:
a passenger compartment air-conditioning apparatus that air-conditions a passenger compartment, a cab air-conditioning apparatus that is different from said passenger air-conditioning apparatus and that air-conditions a cab formed by an enclosure separate from the passenger compartment, a passenger compartment duct through which air conditioned by said passenger compartment air-conditioning apparatus is allowed to flow to the passenger compartment, and a cab duct through which air conditioned by said cab air-conditioning apparatus is allowed to flow to the cab, wherein
said passenger compartment duct includes a passenger compartment air blow opening through which air is supplied into said passenger compartment and said passenger compartment duct includes a cab-duct communicating opening that is connected to said cab duct,
said cab duct includes a cab air blow opening through which air is supplied into said cab and said cab duct includes a passenger-compartment-duct communicating opening that is connected to said passenger compartment duct,
a bypass duct connected between said passenger compartment duct and said cab duct, and
the vehicle air-conditioning system includes
a duct opening and closing device in said bypass duct that turns communication from said passenger compartment duct to said cab duct ON or OFF;
at least one cab air outlet through which air in said cab is discharged to the outside of said cab; and
an outlet opening and closing device that is positioned so that its movement opens or closes the at least one cab air outlet by blocking or not blocking the at least one cab air outlet, wherein
said at least one cab air outlet includes a first outlet opened so as to communicate with an air intake side of said cab air-conditioning apparatus and a second outlet opened so as to communicate with said passenger compartment,
said outlet opening and closing device selectively discharges the air in said cab to either the outside air intake side of said cab air-conditioning apparatus or said passenger compartment,
in normal mode, said duct opening and closing device turns the communication from said passenger compartment duct to said cab duct OFF, and said outlet opening and closing device opens said first outlet, and in the case of failure of said cab air-conditioning apparatus, said duct opening and closing device turns the communication from said passenger compartment duct to said cab duct ON, and said outlet opening and closing device opens said second outlet.

2. The vehicle air-conditioning system of claim 1, wherein a vehicle including said cab has an openable and closable window or opening and the window or opening serves as said at least one cab air outlet and said outlet opening and closing device.

3. The vehicle air-conditioning system of claim 2, further comprising:
   a cab temperature sensor that detects a temperature in the cab; and
   a passenger compartment air-conditioning controller that controls the operation of said passenger compartment air-conditioning apparatus, wherein
   said passenger compartment air-conditioning controller is communicably connected with said cab temperature sensor, and
   said passenger compartment air-conditioning controller controls said passenger compartment air-conditioning apparatus on the basis of a value detected by said cab temperature sensor to control air-conditioning of said cab.

4. The vehicle air-conditioning system of claim 1, further comprising:
   a cab temperature sensor that detects a temperature in the cab; and
   a passenger compartment air-conditioning controller that controls the operation of said passenger compartment air-conditioning apparatus, wherein
   said passenger compartment air-conditioning controller is communicably connected with said cab temperature sensor, and
   said passenger compartment air-conditioning controller controls said passenger compartment air-conditioning apparatus on the basis of a value detected by said cab temperature sensor to control air-conditioning of said cab.

5. The vehicle air-conditioning system of claim 1, further comprising:
   a cab temperature sensor that detects a temperature in the cab; and
   a passenger compartment air-conditioning controller that controls the operation of said passenger compartment air-conditioning apparatus, wherein
   said passenger compartment air-conditioning controller is communicably connected with said cab temperature sensor, and
   said passenger compartment air-conditioning controller controls said passenger compartment air-conditioning apparatus on the basis of a value detected by said cab temperature sensor to control air-conditioning of said cab.

6. A vehicle air-conditioning system comprising:
   a passenger compartment air-conditioning apparatus that air-conditions a passenger compartment, a cab air-conditioning apparatus that is different from said passenger air-conditioning apparatus and that air-conditions a cab formed by an enclosure separate from the passenger compartment, a passenger compartment duct through which air conditioned by said passenger compartment air-conditioning apparatus is allowed to flow to the passenger compartment, and a cab duct through which air conditioned by said cab air-conditioning apparatus is allowed to flow to the cab, wherein
   said passenger compartment duct includes a passenger compartment air blow opening through which air is supplied into said passenger compartment and said passenger compartment duct includes a cab-duct communicating opening that is connected to said cab duct,
   said cab duct includes a cab air blow opening through which air is supplied into said cab and said cab duct includes a passenger-compartment-duct communicating opening that is connected to said passenger compartment duct,
   a bypass duct connected between said passenger compartment duct and said cab duct, and
   the vehicle air-conditioning system includes
   a duct opening and closing device in said bypass duct that turns communication from said passenger compartment duct to said cab duct ON or OFF;
   at least one cab air outlet through which air in said cab is discharged to the outside of said cab; and
   an outlet opening and closing device that is positioned so that its movement opens or closes the at least one cab air outlet by blocking or not blocking the at least one cab air outlet, wherein
   said at least one cab air outlet includes a first outlet opened so as to communicate with an air intake side of said cab air-conditioning apparatus and a third outlet opened so as to communicate with an outside air side,
   said outlet opening and closing device opens or closes said third outlet
   in normal mode, said duct opening and closing device turns the communication from said passenger compartment duct to said cab duct OFF, and said outlet opening and closing device closes said third outlet, and
   in the case of failure of said cab air-conditioning apparatus, said duct opening and closing device turns the communication from said passenger compartment duct to said cab duct ON, and said outlet opening and closing device opens said third outlet.

7. The vehicle air-conditioning system of claim 6, wherein a vehicle including said cab has an openable and closable window or opening and the window or opening serves as said at least one cab air outlet and said outlet opening and closing device.

8. The vehicle air-conditioning system of claim 6, further comprising:
   a cab temperature sensor that detects a temperature in the cab; and
   a passenger compartment air-conditioning controller that controls the operation of said passenger compartment air-conditioning apparatus, wherein
   said passenger compartment air-conditioning controller is communicably connected with said cab temperature sensor, and
   said passenger compartment air-conditioning controller controls said passenger compartment air-conditioning apparatus on the basis of a value detected by said cab temperature sensor to control air-conditioning of said cab.

9. A vehicle air-conditioning system comprising:
   a passenger compartment air-conditioning apparatus that air-conditions a passenger compartment, a cab air-conditioning apparatus that is different from said passenger air-conditioning apparatus and that air-conditions a cab formed by an enclosure separate from the passenger compartment, a passenger compartment duct through which air conditioned by said passenger compartment air-conditioning apparatus is allowed to flow to the passenger compartment, and a cab duct through which air conditioned by said cab air-conditioning apparatus is allowed to flow to the cab, wherein said passenger compartment duct includes a passenger compartment air blow opening through which air is supplied into said passenger compartment and said passenger compartment duct includes a cab-duct communicating opening that is connected to said cab duct, said cab duct includes a cab air blow opening through which air is supplied into said cab and said cab duct includes a passenger-compartment-duct communicating opening that is connected to said passenger compartment duct, a bypass duct connected between said passenger compartment duct and said cab duct, and the vehicle air-conditioning system includes a duct opening and closing device in said bypass duct that turns communication from said passenger compartment duct to said cab duct ON or OFF;

at least one cab air outlet through which air in said cab is discharged to the outside of said cab;

an outlet opening and closing device that is positioned so that its movement opens or closes the at least one cab air outlet by blocking or not blocking the at least one cab air outlet;

a cab temperature sensor that detects a temperature in the cab; and a passenger compartment air-conditioning controller that controls the operation of said passenger compartment air-conditioning apparatus, wherein said passenger compartment air-conditioning controller is communicably connected with said cab temperature sensor, and said passenger compartment air-conditioning controller controls said passenger compartment air-conditioning apparatus on the basis of a value detected by said cab temperature sensor to control air-conditioning of said cab.

10. The vehicle air-conditioning system of claim 9, further comprising:

a monitoring device that monitors air in the vehicle, wherein the value detected by said cab temperature sensor is transmitted through said monitoring device to said passenger compartment air-conditioning controller.

11. The vehicle air-conditioning system of claim 9, wherein a vehicle including said cab has an openable and closable window or opening and the window or opening serves as said at least one cab air outlet and said outlet opening and closing device.

* * * * *